Dec. 10, 1968     H. E. STASSEN     3,414,986
VISUAL TEACHING AID

Filed Sept. 19, 1966     3 Sheets-Sheet 1

INVENTOR.
HAROLD E. STASSEN
BY
Paul + Paul
ATTORNEYS.

Dec. 10, 1968     H. E. STASSEN     3,414,986
VISUAL TEACHING AID
Filed Sept. 19, 1966          3 Sheets-Sheet 2
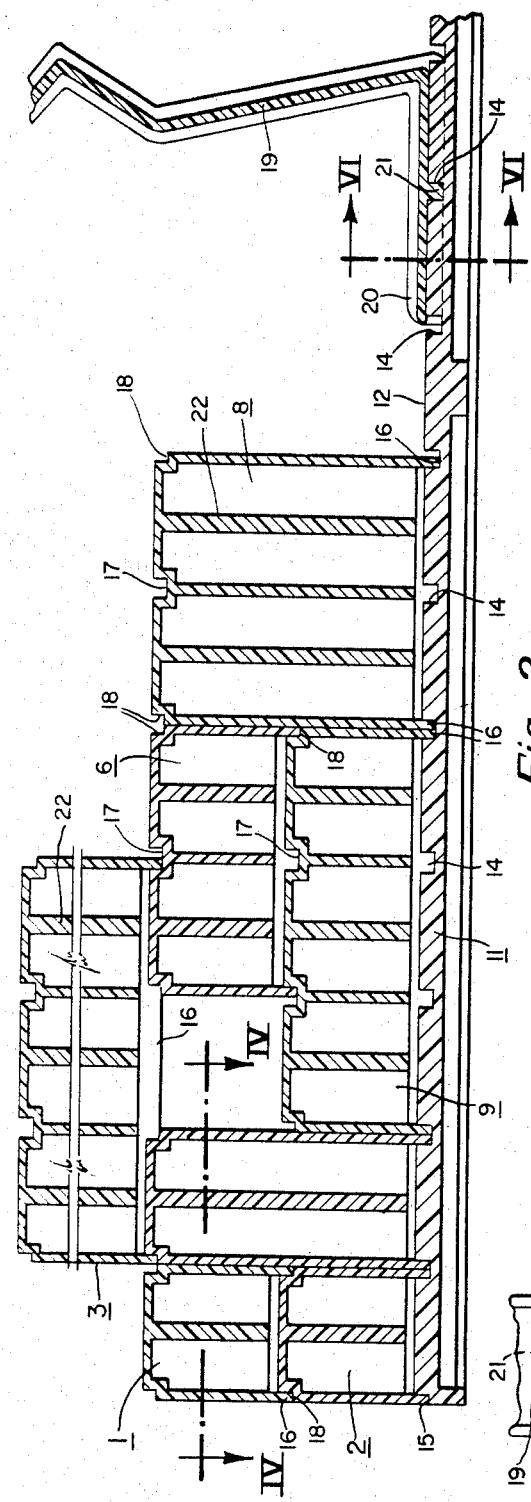
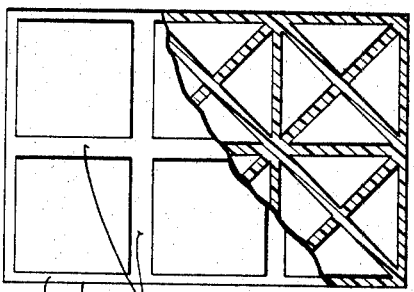
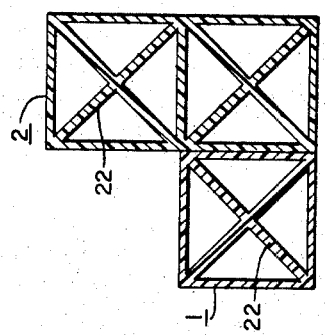
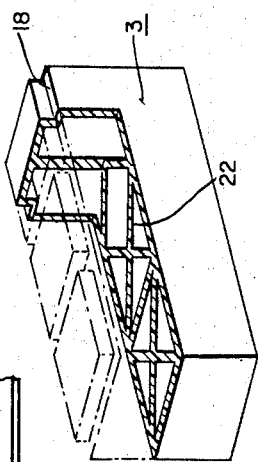
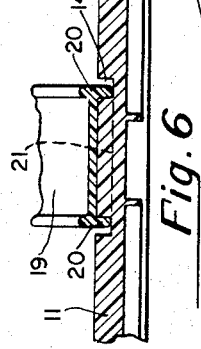
INVENTOR.
HAROLD E. STASSEN
BY
Paul + Paul
ATTORNEYS.

United States Patent Office 3,414,986
Patented Dec. 10, 1968

3,414,986
VISUAL TEACHING AID
Harold E. Stassen, 721 Penn Towers Apartments, 1801
John F. Kennedy Blvd., Philadelphia, Pa. 19103
Filed Sept. 19, 1966, Ser. No. 580,298
8 Claims. (Cl. 35—31)

ABSTRACT OF THE DISCLOSURE

A visual teaching aid is provided in which numbered blocks of cubic size proportional to a number affixed thereto are mounted on an open base member having a plurality of raised rectangular mounting surfaces. The numbered blocks have raised rectangular surfaces extending from their upper surfaces corresponding in number and size to the base member raised rectangular surfaces covered by the numbered blocks thus providing a duplication of mounting surfaces at progressively higher levels.

---

This invention relates to apparatus which is useful in teaching, and particularly to visual aid teaching apparatus especially adapted to teaching the basic operations of mathematics in the early stages of learning.

Heretofore, it has been proposed to provide rectangular blocks to aid in the teaching of arithmetic in which the cardinal numbers were represented by a number of rectangular blocks in which the only variable to be observed was one of length. One such block system is shown in U.S. Patent No. 3,229,388 dated Jan. 18, 1966. The principal difficulty in block systems of this type has been the necessity of providing a box-like container to hold the blocks, thus making manipulation and viewing difficult, with the further difficulty of representation of the numbers and their relationships vertically as well as horizontally.

One subject of the present invention is to provide a plurality of blocks bearing the cardinal number designations in which the total volume of any particular block is directly related to the cardinal number which it represents, with each block being provided with engagement means enabling it to be fixably positioned on a base member and with each block being provided with means for engaging other blocks which may be superimposed thereon.

A further object of the present invention is to provide blocks having internal strengthening members.

A still further object is to provide a combination of a generally flat and open base member together with a plurality of number blocks and mathematical insignia having means adapted to fit into slots formed in said base member whereby combinations of blocks may be fitted onto said base member and onto the tops of each other and still remain completely visible to both student and the teacher.

These and additional objects are attained by the present invention which is described in the present specification by reference to a preferred form as illustrated in the drawings in which:

FIG. 2 is a cross section taken centrally through the base member and a number of blocks positioned thereon;

FIG. 3 is a perspective view partially broken away and in section of one of the blocks;

FIG. 4 is a cross section taken by the arrows IV–IV in FIG. 2;

FIG. 5 is a plan view partially broken away and in section of the block 6 of FIG. 1;

FIG. 6 is a view as taken by the arrows VI–VI in FIG. 2;

Figure 1:
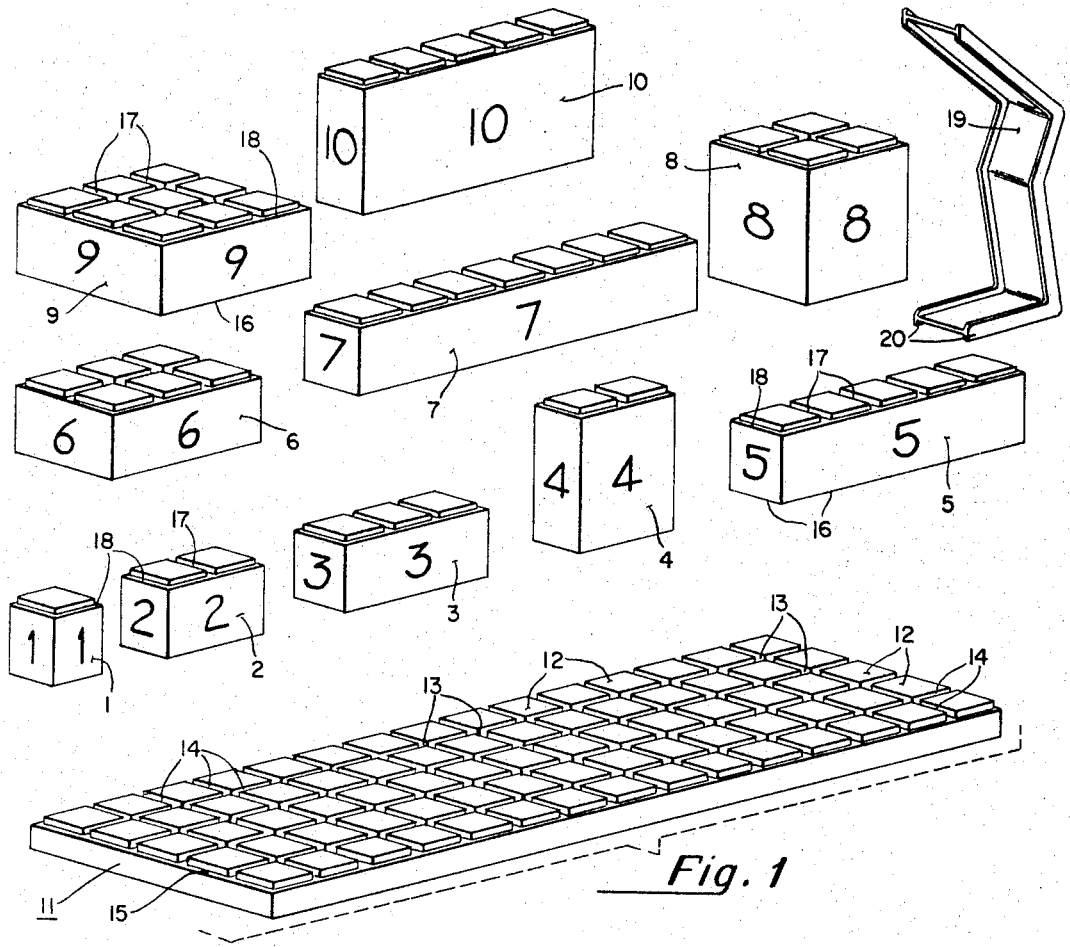
FIG. 1 is a perspective view of the open base member, the various blocks representing the cardinal numbers, and one of several mathematical symbols.

In using the invention in the form shown in the drawings, the open base member 11 is used by the student as a work surface which supports and holds in position in open view the various blocks which are selected by the student. As shown in FIGURE 1, the base member 11 is provided across its upper surface with a number of rectangular upward projections 12 formed by the intersecting slots 13. As shown in FIGURE 2, the central slots of the base member 11, such as the slot 14, are substantially wider than the peripheral space 15 which extends completely around the base member 11. This extra width in the internal slots makes possible the fitting of one block against another by fitting the downwardly projecting legs 16 in pairs into these wider slots as shown in FIGURE 2. It will also be noted that the blocks are provided at their upper surfaces with similar internal slots 17 substantially wider than the spaces 18 which are formed around the periphery of each block.

A number of mathematical symbols, such as the set symbol 19 of FIGURE 1, are provided. These are held in position on the base member 11 by means of peripheral downwardly extending flanges 20 as shown in FIGURE 1, and by a downwardly extending transverse ridge 21 which engages a selected wide internal slot of base member 11 as shown at the right side of FIGURE 2.

In order to provide the capability of forming the various blocks of a suitable plastic and at the same time having them be strong and durable and capable of retaining their shape while at the same time being light in weight, an internal construction consisting of vertically extending cross members 22 is provided as shown in FIGURES 3, 4 and 5. These cross members or webs extends downwardly of the block to a level just above the upper surfaces 12 of the base member 11 as shown in FIGURE 2. Consequently the side walls and legs of each block are held firmly in position while at the same time the block is light in weight and easily handled since it has an essentially open interior.

Figure 7:
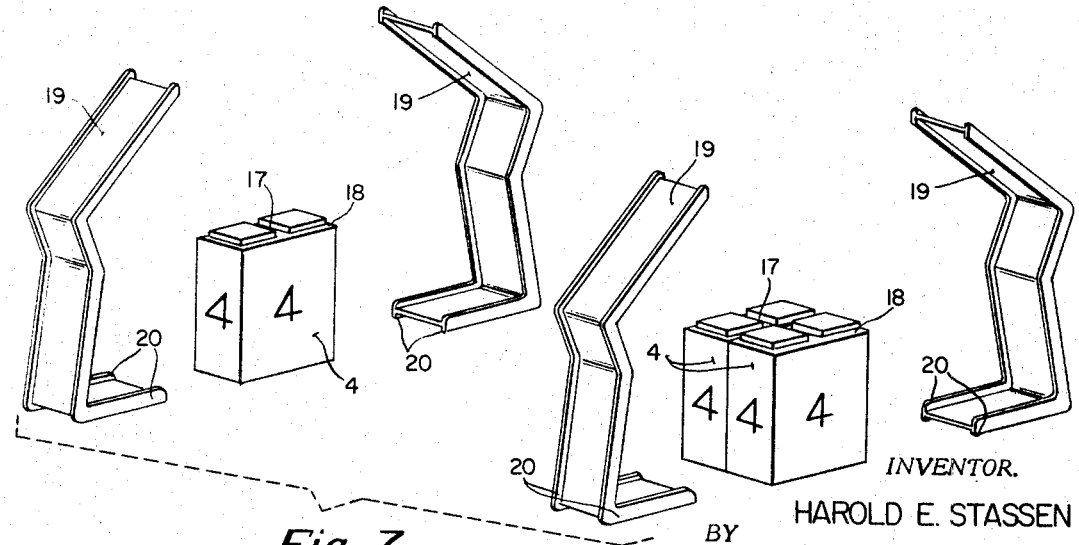
FIG. 7 is a perspective view showing the use of the invention in teaching the relationship of two different sets of numbers where one set is twice the other set.
Figure 8:
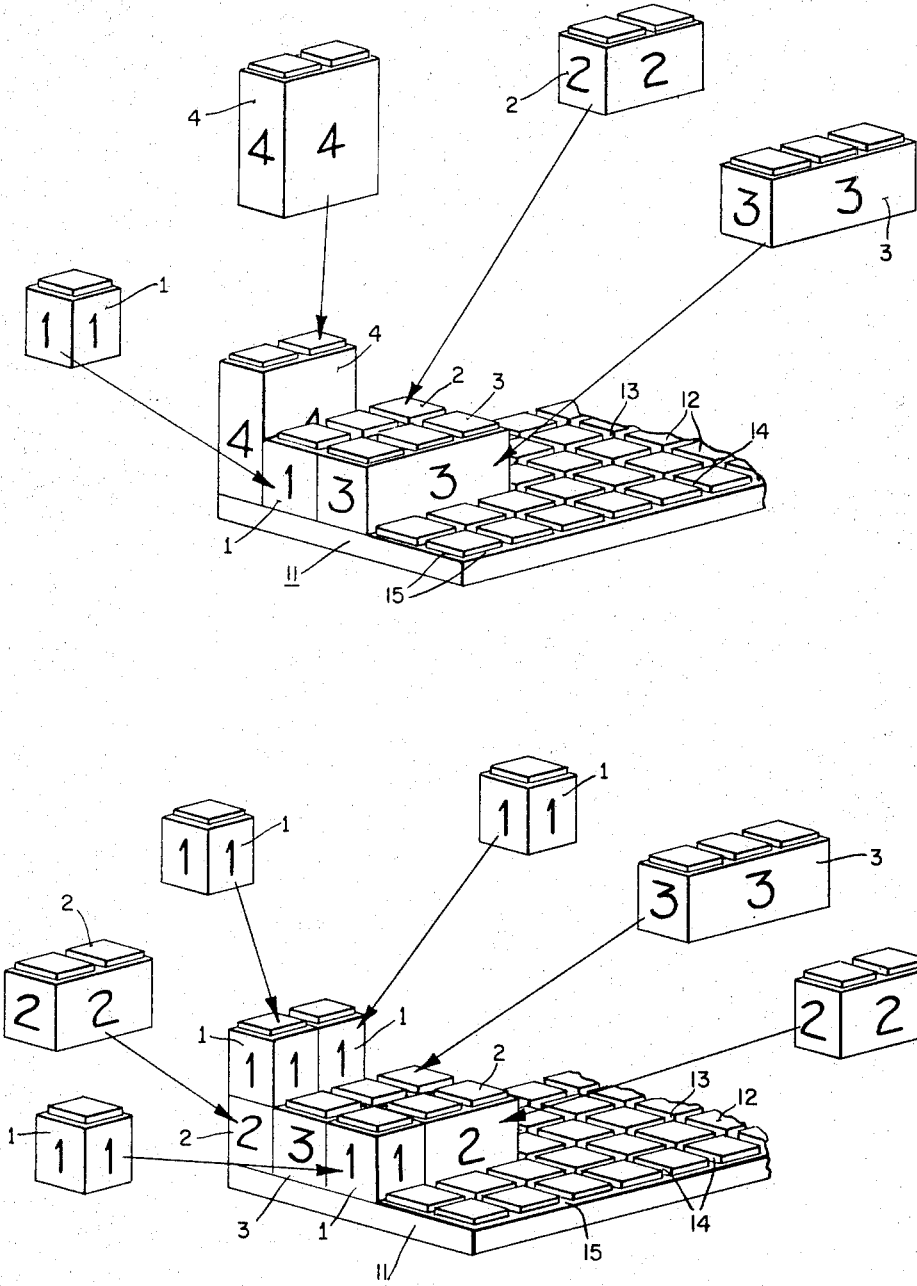
FIG. 8 comprises two views in perspective showing the use of the invention in teaching addition relationships.

In using the combination of elements comprising the present invention, the instructor who may wish to teach the concept of sets of members may establish a configuration made up of a number of blocks on the instructor's base member on the upper showing of FIGURE 8. Initially the student may merely be asked to build an equal set on the student's base member using exactly the same numbered blocks. Subsequently a student may be asked to produce an equal set using differently numbered blocks as indicated in the lower showing of FIGURE 8. The teacher also may establish a set as shown at the left-hand side of FIGURE 7 and ask the student to produce a set which is twice the size thereof or any other multiple, in which case the student would be expected to establish a set on his student base member having a cubic size corresponding to that shown at the right side of FIGURE 7.

In order to indicate the various operations of addition, subtraction, division and multiplication, individual blocks bearing such operational signs would also be included.

It will be seen from the above description that the various blocks bear a direct relationship to one another such that the cubic size is proportional to the prime number represented by the block. This relationship is maintained not only when the block extends laterally, as in the case of the number 5 block, but also when it extends both laterally and vertically, as in the case of the number 8 block. Consequently, a student acquires early in the learning process a clear and accurate impression of the relative significance of numbers, quantities, mass and weight. It is also important to note that the relationships of size are continuously observable by visual inspection, both by the student and the teacher, since the blocks remain in open view after being positioned on the base member.

Having described the present invention by reference to a preferred from thereof, it will be understood that various modifications may be incorporated within the general scope of the invention as defined in the following claims.

I claim:

1. A visual teaching aid comprising, in combination, an open base member having intersecting slots forming a plurality of raised rectangular mounting surfaces and a plurality of rectangular, numbered blocks having downwardly extending outer walls terminating in peripheral edges adapted to engage said base member slots, thereby covering a plurality of said raised rectangular surfaces, said blocks having a plurality of raised rectangular surfaces extending from their upper surfaces corresponding in number and size to the raised rectangular surfaces on said base covered by said blocks, each of said blocks bearing a cardinal number and having a cubic size proportional to such cardinal number.

2. The combination of claim 1 in which each of said blocks has internal intersecting strengthening webs.

3. The combination of claim 1 in which the open base member is provided with a peripheral space which is narrower than the said intersecting slots.

4. The combination of claim 1 further characterized by structures indicating mathematical symbols and means positioned on said structures for engaging intersecting slots of the said base member.

5. The combination of claim 1 in which said blocks are provided with peripheral spaces extending around their upper surfaces.

6. The combination of claim 3 in which the peripheral space of the base member has substantially the same width as the peripheral edges of the walls of the blocks.

7. The combination of claim 3 in which the base member slots are substantially twice as wide as the peripheral space.

8. The combination of claim 2 in which the strengthening webs are positioned on diagonals of the rectangular blocks and terminate short of the lower edges of the outer walls of said blocks.

References Cited

UNITED STATES PATENTS

| | | | |
|---|---|---|---|
| 2,635,355 | 4/1953 | Thompson et al. | 35—31 |
| 3,094,792 | 6/1963 | Morgan et al. | 35—31 |

FOREIGN PATENTS

| | | |
|---|---|---|
| 1,231,193 | 4/1960 | France. |
| 1,263,118 | 4/1961 | France. |
| 744,850 | 2/1956 | Great Britain. |
| 919,025 | 2/1963 | Great Britain. |

EUGENE R. CAPOZIO, *Primary Examiner.*

WILLIAM H. GRIEB, *Assistant Examiner.*

U.S. Cl. X.R.

35—70, 72